United States Patent
Miyagoshi et al.

Patent Number: 6,137,838
Date of Patent: Oct. 24, 2000

[54] VIDEO ENCODING APPARATUS AND METHOD

[75] Inventors: Eiji Miyagoshi, Osaka; Akihiro Watabe, Nara, both of Japan

[73] Assignee: Matsushita Electric Industrial Co., Ltd., Osaka, Japan

[21] Appl. No.: 09/007,069

[22] Filed: Jan. 14, 1998

[30] Foreign Application Priority Data

Jan. 16, 1997 [JP] Japan ................................ 9-005719

[51] Int. Cl.[7] .................................................. H04N 7/50
[52] U.S. Cl. .................... 375/240.26; 711/167; 348/718; 348/719
[58] Field of Search ............................. 375/240, 240.26; 348/409, 718, 719; 711/167

[56] References Cited

U.S. PATENT DOCUMENTS

| | | | |
|---|---|---|---|
| 5,463,607 | 10/1995 | Roth | 369/48 |
| 5,504,876 | 4/1996 | Dougall | 711/167 |
| 5,644,306 | 7/1997 | Brent . | |
| 5,657,016 | 8/1997 | Bakhmutsky et al. . | |
| 5,809,538 | 9/1998 | Pollmann | 711/167 |

FOREIGN PATENT DOCUMENTS

| | | |
|---|---|---|
| 07312756 | 11/1995 | Japan . |
| 08163559 | 6/1996 | Japan . |
| WO 94/24822 | 10/1994 | WIPO . |

*Primary Examiner*—Howard Britton
*Attorney, Agent, or Firm*—McDermott, Will & Emery

[57] ABSTRACT

The present invention provides a video encoding apparatus including a video processor for performing video processing on input video data, a variable length encoder for performing variable length encoding on the processed (quantized) video data and for supplying the encoded data and a generated bit quantity, a DRAM for storing the encoded data that is output as a bitstream, a bitstream output circuit for computing, based on a value found by subtracting the generated bit quantity from a set bit quantity predetermined in advance, a period taken to read from the DRAM the bitstream and for outputting the bitstream as output video data in the computed period, and an arbiter for controlling the operations of the video processor, the variable length encoder, the DRAM, and the bitstream output circuit.

10 Claims, 5 Drawing Sheets

VIDEO ENCODING APPARATUS AND METHOD

BACKGROUND OF THE PRESENT INVENTION

The present invention relates to an apparatus and method for supplying encoded data, derived from variable length encoding of video data, in bitstream form.

In conventional video encoding apparatus, such encoded data is written directly into a first in first out (FIFO) memory and is read from the FIFO memory as a bitstream. A cycle time, taken to-read from a FIFO memory encoded data that is derived from variable length encoding of video data for every processing unit, is fixed correspondingly to the largest of bit quantities of the encoded data assumed in the processing unit.

Such a conventional configuration is problematic. For example, whether bitstreams are output with efficiencies or with inefficiencies depends upon the total bit quantity of encoded data generated by variable length encoding. A write operation cycle time, taken to write encoded data in a FIFO memory, varies widely depending on the quantity of video data per processing unit of the write operation. On the other hand, as described above, a read operation cycle time, taken to read the encoded data from the FIFO memory, is fixed correspondingly to the largest bit quantity of the write operation processing unit. This means that, at the time of reading encoded data having a bit quantity smaller than the assumed largest bit quantity from a FIFO memory, there is produced a difference between the set cycle time and actual read time, therefore wasting time. This prevents a rise in the system processing efficiency. When trying to improve the processing efficiency by a reduction of the time to be wasted, this requires an increase in the memory bitwidth or an increase in the operating frequency therefore resulting in an increase in the system cost.

SUMMARY OF THE PRESENT INVENTION

Bearing in mind the above-described problems with prior art techniques, the present invention was made. Accordingly, a general object of the present invention is to improve system processing efficiency.

In order to achieve the object, the present invention provides as a solution to the problems an improved video encoding apparatus for performing variable length encoding on video data from which to obtain variable length encoded data, and for supplying the obtained variable length encoded data in bitstream format. The video encoding apparatus of the present invention has a storage means for storing encoded data, an encoder means for performing variable length encoding on video data from which to produce variable length encoded data and for writing the encoded data in the storage means, a bitstream output means for reading encoded data from the storage means and for providing the encoded data In the form of a bitstream, and an arbiter means for conducting arbitration to determine which of the encoder means and the bitstream output means will gain access to the storage means in order that the encoded data generated in the encoder means may be written into the storage means in a write operation period according to the quantity of the generated encoded data, and that the encoded data may be read from the storage means in a read operation period obtained by subtracting the write operation period from a predetermined period.

Accordingly, whereas a longer write operation period and a shorter read operation period are realized for a large quantity of encoded data, a shorter write operation period and a longer read operation period are realized for a small quantity of encoded data. Encoded data are read from the storage means in such read operation periods and are output in the form of a bitstream. If the quantity of encoded data that are generated and written into the storage memory is large, then reading bitstreams from the storage means is executed in a shorter read operation period, and if the quantity is small, then such bitstream reading is executed in a longer read operation period. To sum up, according to the quantity of encoded data that have been written in a memory, bitstreams are constantly and efficiently read out without wasting time, thereby improving system processing efficiency.

BRIEF DESCRIPTION OF THE ACCOMPANYING DRAWINGS

DETAILED DESCRIPTION OF THE INVENTION

Preferred embodiments of the present invention are now described by reference to the accompanying drawing figures. The description will be made in terms of, for example, MPEG (Moving Picture Experts Group) animated images as input video data.

Figure 1:
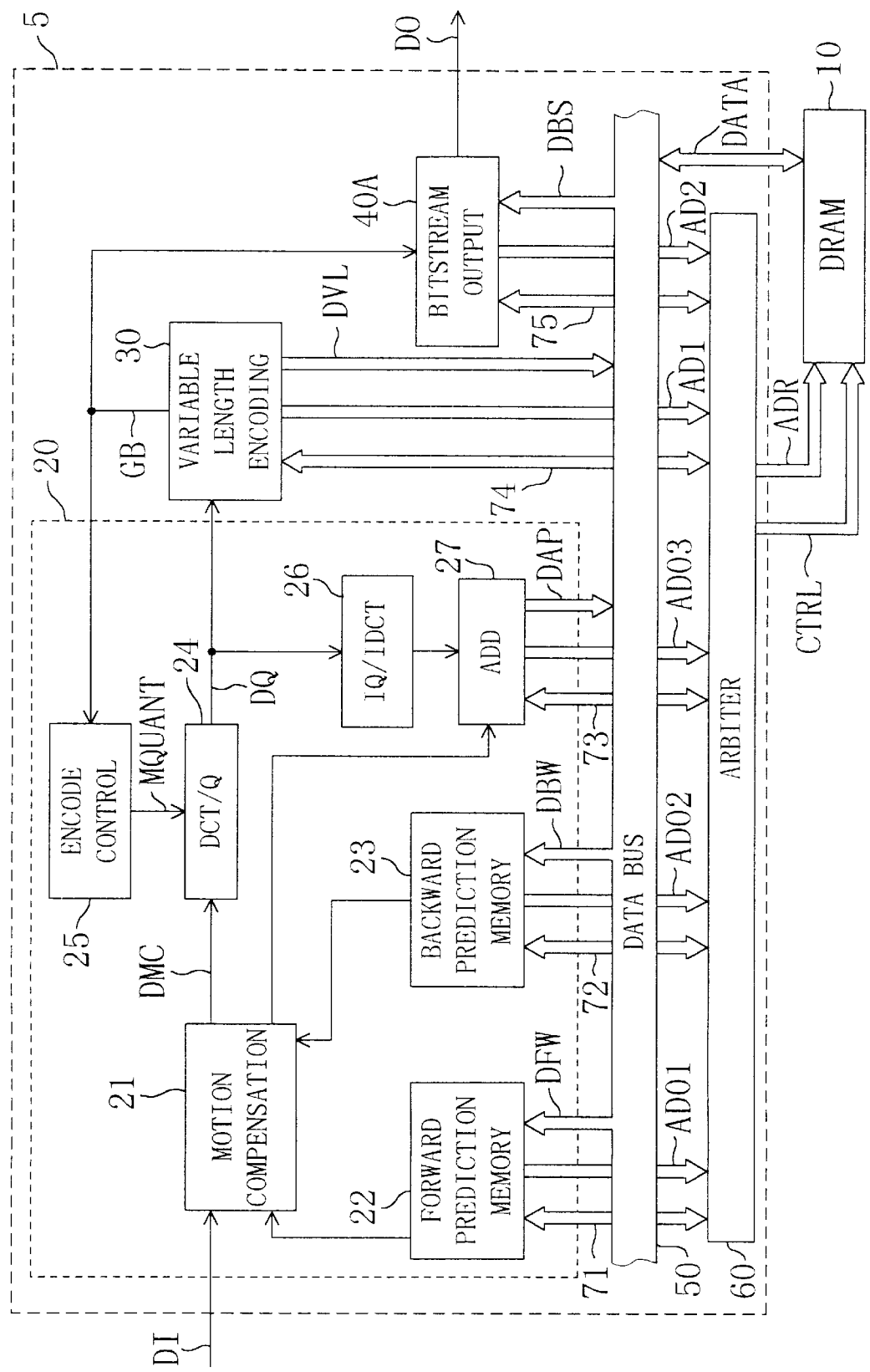
FIG. 1 is a block diagram of a video encoding apparatus in accordance with a first embodiment of the present invention.

Reference is made to FIG. 1 to describe a first embodiment of this invention. FIG. 1 shows a video encoding apparatus which has an integrated circuit 5 and a DRAM (Dynamic Random Access Memory) 10. The integrated circuit 5 has a video processing unit 20, a variable length encoder 30, a bitstream output circuit 40A, a data bus 50, and an arbiter 60.

The video processing unit 20 has a motion compensation circuit 21, a forward prediction memory 22, a backward prediction memory 23, a DCT (Discrete Cosine Transform)/quantization (Q) unit 24, an encode controller circuit 25, an inverse quantization (IQ) /inverse DCT (IDCT) unit 26, and an adder 27. The motion compensation circuit 21 is a motion compensation means for generating, based on input video data DI received from outside and on prediction video data received from the prediction memories 22 and 23, difference video data DMC with the aim of reducing the degree of redundancy of the time-axis direction. The DCT/Q unit 24 is a transform means for subjecting the data DMC to DCT/Q processing on the basis of a received quantization coefficient MQUANT to generate quantized video data DQ, with the aim of reducing the degree of redundancy of the space-axis direction. The encode controller circuit 25 is an encoding controller means for fixing the bitrate of the data DQ by calculating, based on an input generated bit quantity GB, the coefficient MQUANT that is used to determine a quantization ratio. The coefficient MQUANT thus calculated is supplied to the DCT/Q unit 24. The coefficient MQUANT is calculated using, for example, a technique known in the art as TM5 (Test Model 5). The IQ/IDCT unit 26 is an inverse transform means for subjecting the data DQ received from the DCT/Q unit 24 to IQ/IDCT processing. The adder 27 is an adder means for performing addition of summing together video data inverse-transformed by the IQ/IDCT unit 26 and video data motion-compensated by the motion compensation circuit 21 so as to generate added video data DAP which is then supplied to the data bus 50.

The variable length encoder 30 is an encoder means for performing variable length encoding on the data DQ received from the DCT/Q unit 24, and for supplying variable length encoded data DVL as a result of the variable length encoding to the data bus 50, and for supplying the bit quantity GB indicative of the quantity of the data DVL to the encode controller circuit 25 and to the bitstream output circuit 40A. In the variable length encoding, data with high frequency of occurrence and data with low frequency of occurrence are assigned a shorter code and a longer code, respectively for encoding, to achieve a reduction of the overall data bit quantity. The bitstream output circuit 40A is a bitstream output means for receiving a bitstream DBS through the data bus 50 while performing signal exchange of a control signal 75 on the basis of the received bit quantity GB, and for supplying the received bitstream DBS as an output video data DO. The data bus 50 is a data path that is used for the supplying of forward prediction video data DFW and backward prediction video data DBW to the forward prediction memory 22 and to the backward prediction memory 23, respectively, for the supplying of the data DAP from the adder 27, for the supplying the data DVL from the variable length encoder 30, for the supplying of the bitstream DBS to the bitstream output circuit 40A, and for the inputting/outputting of video data DATA of the aforesaid data to and from the DRAM 10. The DRAM 10 is a storage means for storing and supplying each data DFW, DBW, DAP, DVL, and DBS. The arbiter 60 is an arbiter means that carries out a variety of functions including: (i) receiving an address signal AD01 from the forward prediction memory 22 and inputting/outputting a control signal 71, (ii) receiving an address signal AD02 from the backward prediction memory 23 and inputting/ outputting a control signal 72, (iii) receiving an address signal AD03 from the adder 27 and inputting/outputting a control signal 73, (iv) receiving an address signal AD1 from the variable length encoder 30 and inputting/outputting a control signal 74, (v) receiving an address signal AD2 from the bitstream output circuit 40A and inputting/outputting a control signal 75, (vi) supplying, based on the aforesaid address signals, an address signal ADR to the DRAM 10 and supplying, based on the aforesaid control signals, a control signal CTRL. The arbiter 61 supplies and receives the control signals 71, 72, 73, 74, and 75 to and from the forward prediction memory 22, the backward prediction memory 23, the adder 27, the variable length encoder 30, and the bitstream output circuit 40A, thereby conducting arbitration to determine the order of preference between each control signal according to the predetermined priorities so as to control the operation of each element of the video processor.

Figure 2:
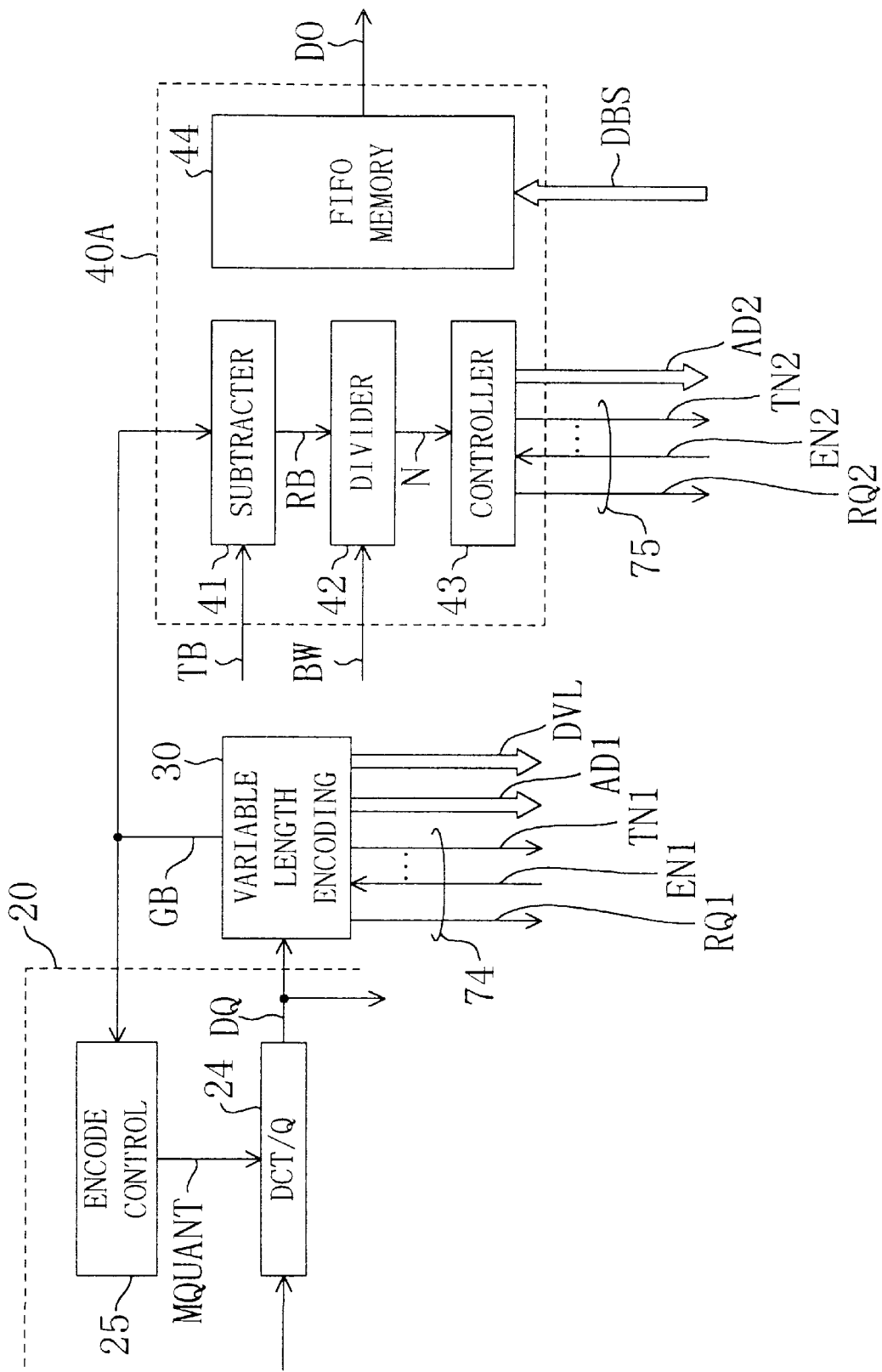
FIG. 2 is a block diagram showing the internal structure of a bitstream output circuit of FIG. 1.
Figure 3:
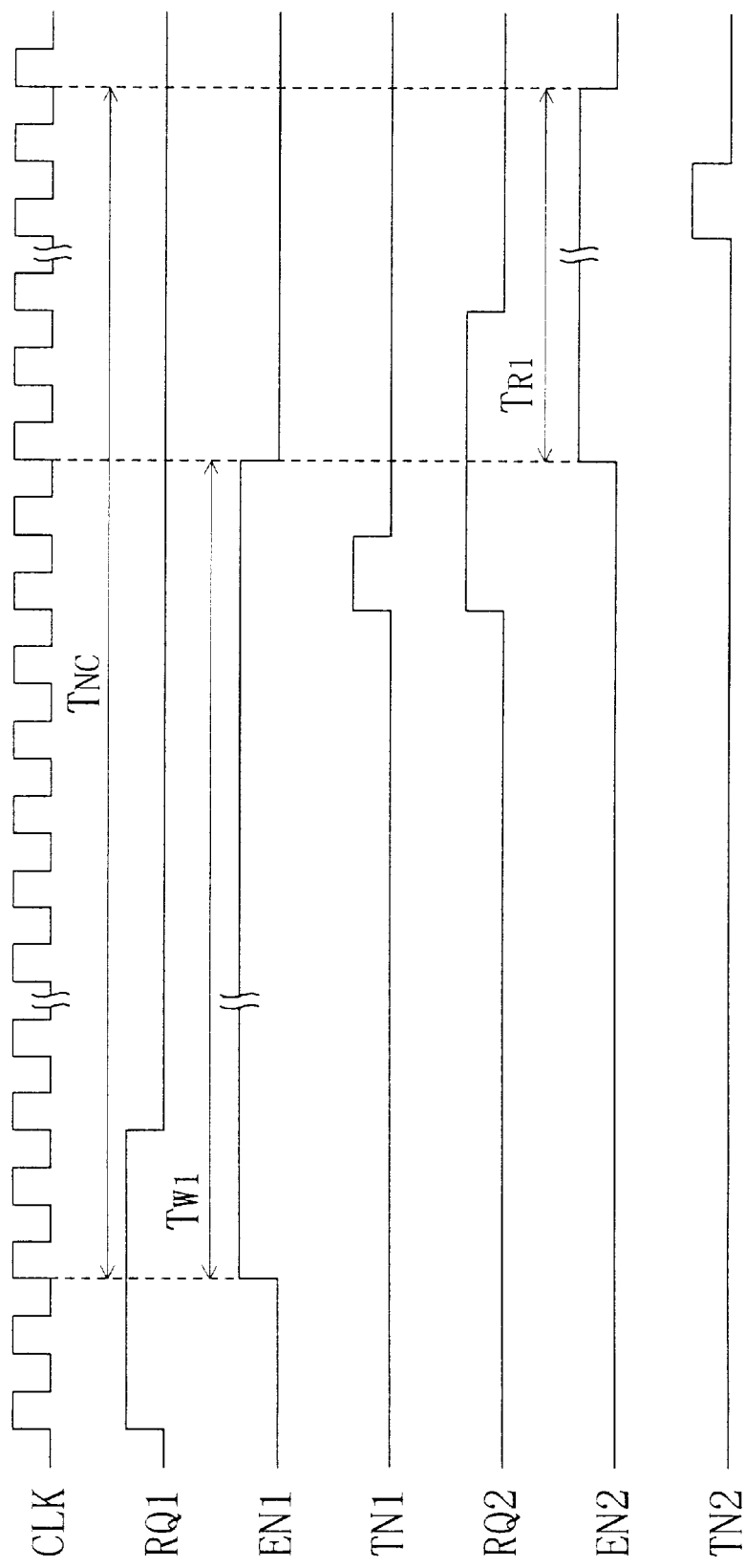
FIG. 3 is a timing chart diagram of certain operations of the FIG. 1 video encoding apparatus when the quantity of encoded data is large.
Figure 4:
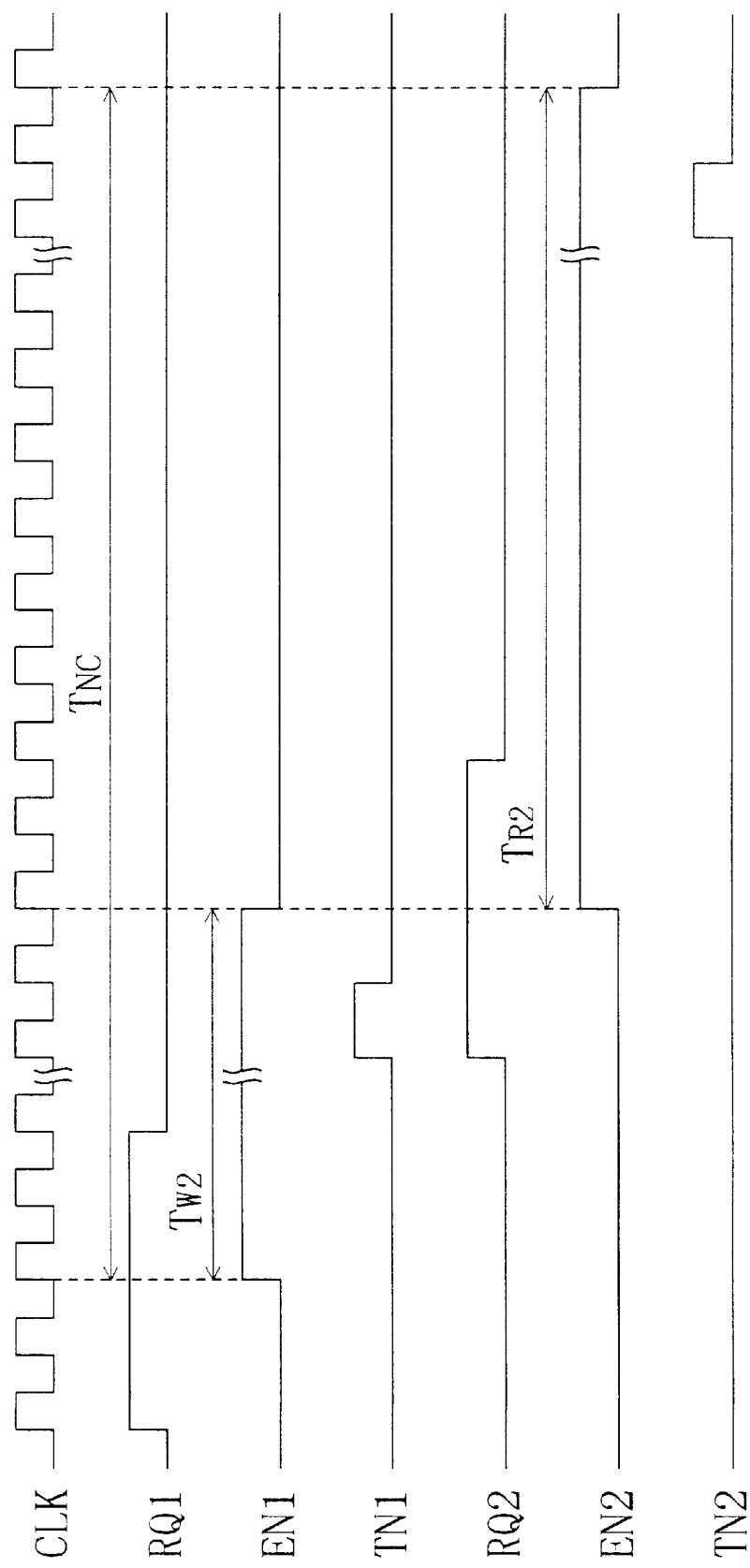
FIG. 4 is another timing chart diagram of certain operations of the FIG. 1 video encoding apparatus when the quantity of encoded data is small.

Referring now to FIGS. 2 through 4, the first embodiment video encoding apparatus, together with its associated method, is fully described.

FIG. 2 is a block diagram showing the internal configuration of the bitstream output circuit 40A of FIG. 1. With respect to the same elements as FIG. 1, the same reference numerals have been used, and they are not described here. The variable length encoder 30 performs a set of functions including: (i) applying to the arbiter 60 an encode request signal RQ1, (ii) supplying, when an encode grant signal ENS that is applied from the arbiter 60 to the variable length encoder 30 is enabled in response to the request signal RQ1, the data DVL to the data bus 50 in a period of time in which the grant signal EN1 is being enabled, and (iii) writing the data DVL in the DRAM 10 in the grant signal's EN1 enable period by applying the address signal AD1 to the arbiter 60. The variable length encoder 30 applies, upon completion of the write operation, an encode termination signal TN1 to the arbiter 60. Further, the variable length encoder 30 supplies the bit quantity GB according to the data DVL generated, to the encode controller circuit 25 and to the bitstream output circuit 40A. The control signal 74 includes the request signal RQ1, the grant signal EN1, and the termination signal TN1.

The bitstream output circuit 40A has a subtracter 41, a divider 42, a controller 43, and a FIFO memory 44. The subtracter 41 is a subtracter means that carries out a set of functions including (i) receiving a predetermined bit quantity TB, (ii) receiving the bit quantity GB from the variable length encoder 30, and (iii) calculating a read bit quantity RB by subtraction of the bit quantity GB from the bit quantity TB. The divider 42 is a divider means that carries out a set of functions including (i) receiving the bit quantity RB and a predetermined data bus width BW, (ii) dividing the bit quantity RB by the bus width BW, and (iii) generating, based on the product, a read signal N that is used to designate the number of times the bitstream DBS is read from the DRAM 10. The controller 43 is an output controller means that carries out a set of functions including (i) supplying a bitstream output request signal RQ2 to the arbiter 60, (ii) receiving from the arbiter 60 a bitstream output grant signal EN2 that is enabled in response to the request signal RQ2, (iii) sequentially supplying the address signal AD2 the number of times corresponding to the read signal N for the reading of the bitstream DBS from the DRAM 10, and (iv) supplying to the arbiter 60 the termination signal TN2 upon completion of the bitstream read operation. The FIFO memory 44 is a memory means that temporarily holds and supplies the bitstream DBS to outside the video encoding apparatus. The control signal 75 includes the request signal RQ2, the grant signal EN2, and the termination signal TN2.

Reference is made to FIG. 3 in which shown Is a timing chart diagram of certain operations of the present video encoding apparatus for a large quantity of encoded data. Each signal is supplied and received in synchronism with a clock signal CLK.

In response to the request signal RQ1 applied from the variable length encoder 30, the grant signal EN1 is enabled in the arbiter 60. The variable length encoder 30 writes the data DVL into the DRAM 10 in a write operation period TW1, i.e., the grant signal's EN1 enable period. Upon completion of the write operation, the variable length encoder 30 supplies the termination signal TN1, in response to which the arbiter 60 disables the grant signal EN1.

Meanwhile, when the bitstream output circuit 40A enters the state that the bitstream output circuit 40A is ready to accept the bitstream DBS from the DRAM 10, the bitstream output circuit 40A supplies the request signal RQ2. In response to the request signal RQ2, the arbiter 60 enables the grant signal EN2 after having waited for the data DVL to be written into the DRAM 10, stated another way, after having waited for the grant signal EN1 to be disabled. The bitstream output circuit 40A reads the bitstream DBS from the DRAM 10 in a read operation period TR1 (i.e., the grant signal's EN2 enable period) and, upon completion of the read operation, supplies the termination signal TN2. In response to the termination signal TN2, the arbiter 60 disables the grant signal EN2.

A set period TNC, i.e., the sum of the write period TW1 and the read period TR1, is predetermined correspondingly to a processing unit at the time of variable length encoding, for example, the largest of video data quantities in a macroblock of 16 by 16 pixels. Accordingly, when the bit quantity GB is great, that is, when the quantity of encoded data is great, the write period TW1, on the one hand, is set longer and the read operation period TR1, on the other hand, is set shorter. When the quantity of the bitstream DBS to be read out is great for the read period TR1, the bitstream DBS is divided into several substreams and read out.

FIG. 4 is a timing chart diagram of certain operations of the video encoding apparatus when the quantity of encoded data is small. In FIGS. 3 and 4, the same reference numerals have been applied to like elements, and the already-described elements are not described here. In the FIG. 4 case, a write operation period TW2 can be shortened correspondingly to that small encoded data quantity, whereby a read operation period TR2, obtained by subtracting the write period TW2 from the set period TNC, can be set longer.

In accordance with the first embodiment of the present invention, the bitstream DBS is read from the DRAM 10 depending upon the quantity of encoded bits that are written into the DRAM 10. More specifically, the bitstream DBS is read from the DRAM 10 in the shorter read period TR1 in the event that the encoded bit quantity is great, while on the other hand the bitstream DBS is read from the DRAM 10 in the longer read period TR2 in the event that the encoded bit quantity is small. Such arrangement allows the bitstream DBS to be read constantly from the DRAM 10 with efficiencies according to the encoded bit quantity to be written into the DRAM 10. The arbiter 60 conducts arbitration among the reading of the data DFW and DBW from the DRAM 10, the writing of the data DAP to the DRAM 10, the writing of the data DVL to the DRAM 10, and the reading of the bitstream DBS from the DRAM 10. This allows the DRAM 10 of a single chip to store the aforesaid data of different types generated at the time of video data processing and encoding and bitstreams that are output from the video encoding apparatus.

Figure 5:
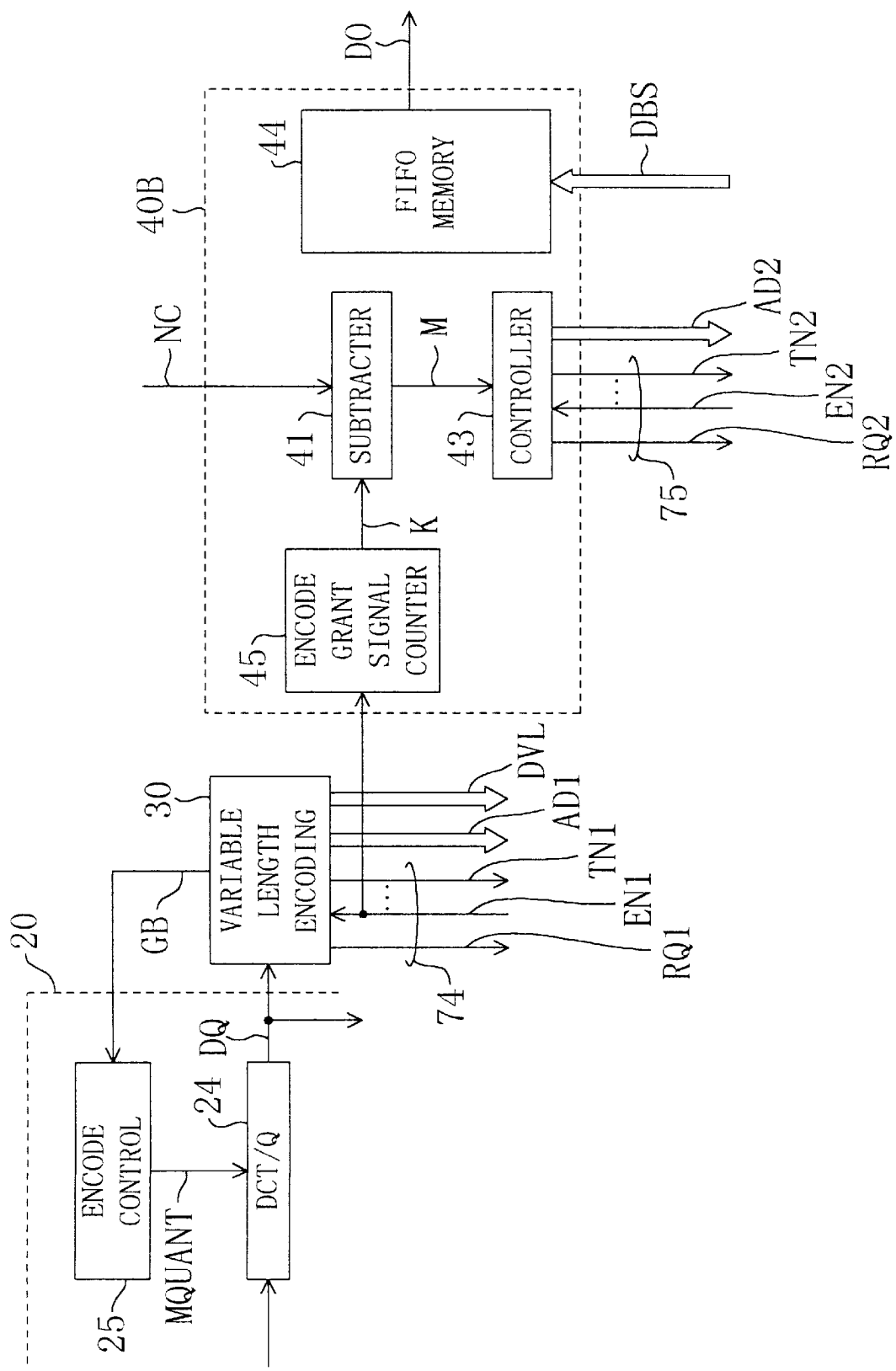
FIG. 5 is a block diagram showing the internal structure of a bitstream output circuit in a video encoding apparatus in accordance with a second embodiment of the present invention.

Reference is made to FIG. 5 to describe a second embodiment of the present invention. FIG. 5 is a block diagram showing the internal configuration of a bitstream output circuit 40B which is a substitution of the bitstream output circuit 40A shown in FIGS. 1 and 2. The same reference numerals have been applied to like elements and signals, and the already-described elements are not described here. The bitstream output circuit 40B of FIG. 5 has an encode grant signal counter 45 in addition to the subtracter 41, the controller 43, and the FIFO memory 44 of the first embodiment. The encode grant signal counter 45 is a counter means that carries out a set of functions including (i) receiving from the arbiter 60 the grant signal EN1 that is also supplied to the variable length encoder 30, (ii) counting the total number of clock signals CLK (see FIGS. 3 and 4) in the grant signal's EN1 enable time, and (iii) supplying the count result as a write operation period indication value K. The subtracter 41 is a subtracter means that carries out a set of functions including (i) receiving a set value NC, (ii) subtracting the indication value K from the set value NC, and (iii) generating a read signal M that is used to designate a read period, i.e., the period in which the bitstream DBS is read from the DRAM 10. The controller 43 is an output controller means that carries out a set of functions including (i) supplying to the arbiter 60 the request signal RQ2, (ii) receiving from the arbiter 60 the grant signal EN2 that is enabled in response to the request signal RQ2, (iii) sequentially supplying to the arbiter 60 the address signal AD2 for a period of time designated by the read signal M for the reading of the bitstream DBS from the DRAM 10, and (iv) supplying, upon completion of the read operation, the termination signal TN2, to the arbiter 60.

Like the first embodiment, also in accordance with the second embodiment, the bitstream DBS is read out constantly with efficiencies according to the encoded bit quantity to be written.

Throughout the first and second embodiments, the description has been made in terms of MPEG moving pictures as input video data. The present invention may find applications in JPEG (Joint Photographic Experts Group) non-moving pictures.

In the present invention, the integrated circuit 5 and the DRAM 10 are formed in separate chips. The integrated circuit and the DRAM 10 may be formed together in a single chip.

As described above, in accordance with the first and second embodiments, it is possible to read the bitstream DBS from the DRAM 10 in a read operation period according to the encoded bit quantity to be written. Accordingly, without a waste of time in read operations, the bitstream DBS can be read out constantly with efficiencies, thereby making improvements on the system processing efficiency. Additionally, eliminating a waste of time in read operations makes it possible to achieve not only a reduction of the bitwidth of the DRAM 10 but also a reduction of the operating frequency of the DRAM 10.

The invention is claimed is:

1. A video encoding apparatus for variable length encoding video data into encoded data, and for supplying said encoded data in bitstream form, said video encoding apparatus comprising:

(a) storage means for storing said encoded data;

(b) encoder means for variable length encoding said video data from which to generate said encoded data, and for writing said generated data into said storage means;

(c) bitstream output means for reading said encoded data from said storage means, and for supplying said encoded data in a bitstream form; and (d) arbiter means for conducting arbitration to determine which of said encoder means and said bitstream output means will gain access to said storage means in order that said encoded data generated by the encoder means may be written into said storage means in a write operation period according to the quantity of said generated encoded data, and that said encoded data may be read from said storage means in a read operation period obtained by subtracting said write operation period from a predetermined period.

2. The video encoding apparatus of claim 1, wherein said predetermined period is determined in order that the largest of bit quantities of said encoded data generated by said encoder means may be written into said storage means.

3. The video encoding apparatus of claim 1, wherein said bitstream output means has output controller means, said output controller means carrying out a set of functions including:

(i) supplying to said arbiter means a request signal representing a demand for a right of access to said storage means;

(ii) in response to a grant signal from said arbiter means that carries information that said right of access to said storage means is granted, reading said encoded data from said storage means; and (iii) upon completion of the reading of said encoded data from said storage means, applying to said arbiter means a termination signal that carries information that said right of access to said storage means is returned.

4. The video encoding apparatus of claim 3, said bitstream output means having:

(a) memory means for temporarily holding encoded data read from said storage means;

(b) subtracter means for receiving a generated bit quantity indicative of the quantity of said encoded data and a set bit quantity determined in advance, and for determining a value indicative of the result of subtracting said generated bit quantity from said set bit quantity as a read bit quantity; and (c) divider means for receiving a value indicative of the data bus width of said storage means and said read bit quantity, and for determining the number of times reading is executed corresponding to said read operation period according to a value indicative of the result of dividing said read bit quantity by said data bus width.

5. The video encoding apparatus of claim 3, said bitstream output means having:

(a) memory means for temporarily holding encoded data read from said storage means;

(b) counter means for receiving an encode grant signal which carries information that a right of access to said storage means is transferred to said encoder means, and for determining a period in which said encode grant signal is being enabled as said write operation period; and (c) subtracter means for receiving signals that represent said write operation period and said set period, respectively, and for subtracting said write operation period from said set period to determine said read operation period.

6. The video encoding apparatus of claim 1 further comprising:

(a) forward prediction storage means for storing first video data that is obtained using prediction from a previous picture;

(b) backward prediction storage means for storing second video data that is obtained using prediction from a future picture; and (c) motion compensation means for generating, based on input video data as well as on said first and second video data, difference video data, and for supplying said difference video data to said encoder means.

7. The video encoding apparatus of claim 6, wherein said storage means, said forward prediction storage means, and said backward prediction means are formed on a single chip.

8. The video encoding apparatus of claim 1 further comprising means for discrete cosine transforming input video data, and for supplying said discrete cosine transformed input video data to said encoder means.

9. The video encoding apparatus of claim 1 further comprising means for quantizing input video data, and for supplying said quantized video data to said encoder means.

10. A method of supplying encoded data obtained by performing variable length encoding on video data in bitstream form, said method comprising the steps of:

(a) writing said encoded data into storage means in a write operation period according to the quantity of said encoded data; and (b) reading from said storage means said encoded data in a period obtained by subtracting said write operation period from a predetermined period, and for supplying said encoded data in the form of a bitstream.

\* \* \* \* \*